(12) United States Patent
Kim et al.

(10) Patent No.: US 7,697,790 B2
(45) Date of Patent: Apr. 13, 2010

(54) APPARATUS AND METHOD FOR ENHANCING QUALITY OF REPRODUCED IMAGE

(75) Inventors: Hye-yeon Kim, Kyungki-do (KR); Shi-hwa Lee, Seoul (KR); Dae-sung Cho, Seoul (KR); Woo-shik Kim, Kyungki-do (KR); Sang-jo Lee, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1095 days.

(21) Appl. No.: 10/717,621

(22) Filed: Nov. 21, 2003

(65) Prior Publication Data
US 2004/0126037 A1   Jul. 1, 2004

(30) Foreign Application Priority Data
Dec. 26, 2002   (KR)   ............ 10-2002-0084088

(51) Int. Cl.
*G06K 9/32* (2006.01)
*H04N 1/46* (2006.01)
*H04N 7/01* (2006.01)
*H04N 11/20* (2006.01)

(52) U.S. Cl. .............. 382/300; 358/525; 348/448
(58) Field of Classification Search ........ 382/300; 358/525; 348/448
See application file for complete search history.

(56) References Cited

U.S. PATENT DOCUMENTS

| 5,019,903 | A | * | 5/1991 | Dougall et al. ........... 348/448 |
| 5,475,438 | A | * | 12/1995 | Bretl ...................... 348/452 |
| 5,619,226 | A | | 4/1997 | Cahill |
| 5,796,437 | A | | 8/1998 | Muraji et al. |
| 5,832,143 | A | | 11/1998 | Suga et al. |
| 5,886,745 | A | | 3/1999 | Muraji et al. |
| 5,894,329 | A | * | 4/1999 | Takeda et al. ............ 348/446 |
| 6,219,464 | B1 | * | 4/2001 | Greggain et al. ......... 382/298 |
| 6,262,773 | B1 | * | 7/2001 | Westerman ............... 348/448 |
| 6,377,307 | B1 | | 4/2002 | Honda |
| 6,836,572 | B2 | * | 12/2004 | Ishiga et al. ............. 382/300 |
| 6,965,705 | B1 | * | 11/2005 | Ma et al. ................. 382/300 |
| 2001/0005429 | A1 | | 6/2001 | Ishiga et al. |
| 2003/0112369 | A1 | * | 6/2003 | Yoo et al. ................ 348/448 |
| 2004/0246546 | A1 | | 12/2004 | Minami et al. |

FOREIGN PATENT DOCUMENTS

EP   0588499 A   3/1994

(Continued)

OTHER PUBLICATIONS

Sun, T. and Neuvo, Y. 1994. Detail-preserving median based filters in image processing. Pattern Recogn. Lett. 15, 4 (Apr. 1994), 341-347.*

(Continued)

*Primary Examiner*—Bhavesh M Mehta
*Assistant Examiner*—Nathan Bloom

(57) ABSTRACT

An apparatus and method for enhancing the quality of reproduced images are provided. More specifically, provided are an apparatus and method for enhancing the quality of reproduced, progressive images, which are capable of obtaining more natural and smoother progressive images and preventing such problems as blurry colors and aliased images that could be brought about in the process of converting interlaced images into progressive images.

32 Claims, 10 Drawing Sheets

FOREIGN PATENT DOCUMENTS

| | | | |
|---|---|---|---|
| EP | 0630154 A | 12/1994 |
| EP | 0710925 A | 5/1996 |
| JP | 02-213289 | 8/1990 |
| JP | 02-293793 | 12/1990 |
| JP | 03-229581 | 10/1991 |
| JP | 03-229583 | 10/1991 |
| JP | 04-364685 | 12/1992 |
| JP | 05-153562 | 6/1993 |
| JP | 08-163511 | 6/1996 |
| JP | 08-163573 | 6/1996 |
| JP | 09-037214 | 2/1997 |
| JP | 09-200575 | 7/1997 |
| JP | 08-186802 | 7/1998 |
| JP | 11-103448 | 4/1999 |
| JP | 11-514810 | 12/1999 |
| JP | 2000-175208 | 6/2000 |
| JP | 2000-341649 | 12/2000 |
| JP | 2001-028052 | 1/2001 |
| JP | 2001-339694 | 12/2001 |
| JP | 2002-010279 | 1/2002 |
| JP | 2002-503428 | 1/2002 |
| JP | 2002-515988 | 5/2002 |
| JP | 2002-223419 | 8/2002 |
| JP | 2003-199054 | 7/2003 |
| JP | 2004-254273 | 9/2004 |
| WO | WO 9635203 A | 11/1996 |
| WO | WO 9636037 A | 11/1996 |
| WO | WO 97/17801 | 5/1997 |
| WO | WO 99/00785 | 1/1999 |
| WO | WO 99/14944 | 3/1999 |

OTHER PUBLICATIONS

Gerard De Haan et al., Deinterlacing—An Overview, Proceedings of the IEEE, Sep. 9, 1988, pp. 1839-1857, vol. 86, No. 9, Television Systems Group, Philips Research Laboratories, Eindhoven 5656 AA The Netherlands.

Korean Patent Office Action and English Translation, Nov. 24, 2004.

Office Action in JP 2003-434628 dated Sep. 9, 2008.

Japanese Office Action dated Sep. 8, 2009 in Japanese Patent Application No. 2003-434628.

* cited by examiner

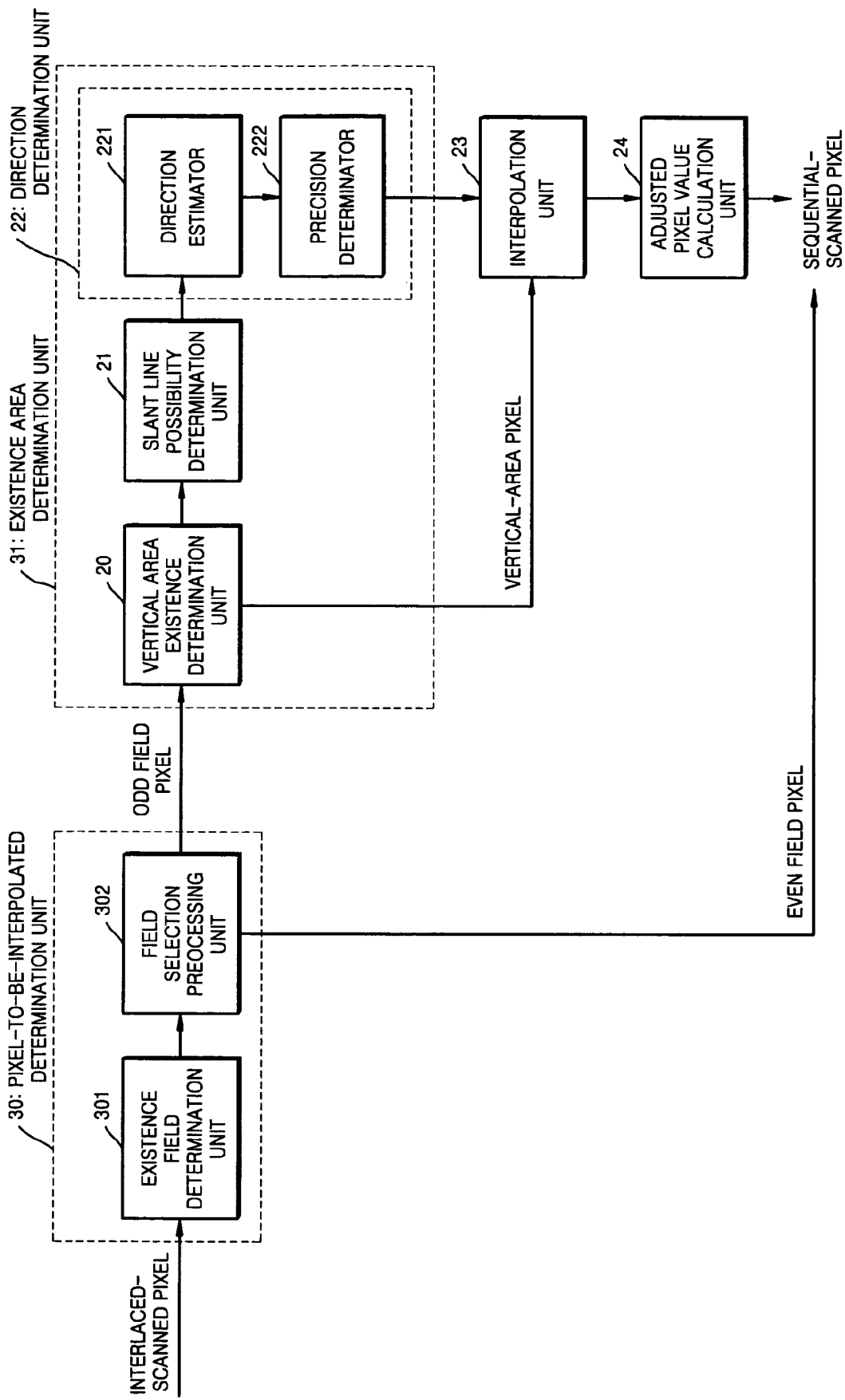

← → DIFFERENCE BETWEEN PIXEL VALUES

☐ ODD FIELD

▨ EVEN FIELD

FIG. 4
  
  
  
 ODD FIELD
 EVEN FIELD

APPARATUS AND METHOD FOR ENHANCING QUALITY OF REPRODUCED IMAGE

This application claims the priority of Korean Patent Application No. 2002-84088, filed on Dec. 26, 2002, in the Korean Intellectual Property Office, the disclosure of which is incorporated herein in its entirety by reference.

BACKGROUND OF THE INVENTION

1. Field of the Invention

The present invention relates to an apparatus and method for enhancing the quality of reproduced images, and more particularly, to an apparatus and method for enhancing the quality of reproduced, progressive images, which are capable of obtaining more natural and smoother progressive images and preventing such problems as blurry colors and aliased images that could be brought about in the process of converting interlaced images into progressive images.

2. Description of the Related Art

A variety of methods of converting an interlaced image into a progressive image (e.g., Korean Patent Application No. 10-1999-7012311 (PCT/US 98/12816)) have already been suggested. Among those methods, a blending method and an edge dependent interpolation method, in particular, will be briefly described in the following paragraphs.

In a blending method, the value of a predetermined pixel is obtained through interpolation by using an interlaced-scanned value of a predetermined input pixel and values of pixels vertically adjacent to the predetermined input pixel. This technique can guarantee smoother and more natural representation of an image, especially, edges of subjects on the image. However, when applied to the case of converting an interlaced image, containing subject's swift motions, into a progressive image, the blending method may undesirably provide a blurry or aliased image or an afterimage.

In an edge dependent interpolation method, an interpolated pixel value is obtained using the values of pixels vertically and horizontally adjacent to a predetermined pixel to be interpolated, a process which is apparent in FIG. 1. As shown in FIG. 1, a progressive-scanned value X' of a predetermined pixel X is obtained using values $D_{lu}$, $D_{ld}$, $D_{ru}$, $D_{rd}$, $V_u$, and $V_d$ of upper left, lower left, upper right, lower right, upper, and lower pixels, respectively, with respect to the predetermined pixel X.

More specifically, the progressive-scanned pixel value X' is obtained through interpolation using a smaller value among $V_u-V_d$, $D_{lu}-D_{rd}$, and $D_{ld}-D_{ru}$. Since this technique takes the values of the pixels, diagonally adjacent to the predetermined pixel X, into account, it can successfully provide more natural and smoother representation of images, especially, slant lines and subject edges on those images, while preventing the images from being aliased.

However, in the case of the conventional edge-dependent interpolation method, there is a great possibility of errors occurring in the process of determining a direction, toward which a slant line representing an edge included in a predetermined input pixel is tilted. In addition, since either odd or even fields of an interlaced image are practically abandoned, it is more likely to see a huge saturation difference between the interlaced image and a corresponding progressive image. Moreover, in the case of converting an interlaced image, containing subjects' swift motions, into a progressive image, colors of an output image may spread undesirably. The conventional edge-dependent interpolation method is taught by Gerald De Haan in Deinterlacing: An Overview, Proceeding of the IEEE, Vol. 86, No. 9, September, 1998.

SUMMARY OF THE INVENTION

The present invention provides an apparatus and method for enhancing the quality of reproduced images, which are capable of preventing blurry images, afterimages, and aliased images.

The present invention also provides an apparatus and method for enhancing the quality of reproduced images, which are capable of reducing the possibility of errors occurring in the process of determining whether or not an edge included in a predetermined input pixel has a slant-line shape and which direction a slant line representing the edge is tilted toward.

The present invention also provides an apparatus and method for enhancing the quality of reproduced images, which are capable of reducing a saturation difference between an interlaced image and a progressive image.

The present invention also provides an apparatus and method for enhancing the quality of reproduced images, which are capable of preventing colors of an image from undesirably spreading in the process of converting an interlaced image into a progressive image.

According to an aspect of the present invention, there is provided an apparatus for enhancing the quality of reproduced images, including a vertical area existence determination unit, a slant line possibility determination unit, a direction determination unit, and an interpolation unit. The vertical area existence determination unit determines whether or not an edge included in an input pixel belongs to a vertical area. The slant line possibility determination unit determines whether or not there is a possibility of the edge forming a slant line when the edge is determined to not belong to the vertical area. The direction determination unit determines a direction of the slant line when the edge is determined to possibly form the slant line. The interpolation unit calculates an interpolated pixel value for the input pixel based on the determination results provided by the vertical area existence determination unit, the slant line possibility determination unit, and the direction determination unit.

According to another aspect of the present invention, there is provided an apparatus for enhancing the quality of reproduced images, including a pixel-to-be-interpolated determination unit, an existence area determination unit, and an interpolation unit. The pixel-to-be-interpolated determination unit determines whether or not an interlaced-scanned input pixel is the one to be interpolated. The existence area determination unit determines whether or not an edge included in the input pixel belongs to a slant line area when the input pixel is determined to be the one to be interpolated. The interpolation unit obtains an interpolated pixel value for the input pixel based on the determination result, provided by the existence area determination unit, by using values of pixels adjacent to the input pixel and designates the interpolated pixel value as an output pixel value.

According to another aspect of the present invention, there is provided an apparatus for enhancing the quality of reproduced images, including a slant line possibility determination unit, and a direction determination unit. The slant line possibility determination unit determines that an edge included in an input pixel may have a slant-line shape when differences between values of two pixels, arranged at each side of the upper pixel, and values of their vertically corresponding pixels are smaller than a difference between upper and lower pixels with respect to the input pixel and are obtained using two pixels, located at one side of the upper pixel, and values of their vertically corresponding pixels. The direction determination unit determines a direction of a slant line representing the edge included in the input pixel.

According to another aspect of the present invention, there is provided an apparatus for enhancing the quality of reproduced images, including a slant line possibility determination unit, and a direction determination unit. The slant line possibility determination unit determines that an edge included in an input pixel may have a slant-line shape when differences between values of two pixels, arranged at one side of the upper pixel, and values of their diagonally corresponding pixels are smaller than differences between values of two pixels located at the other side of the upper pixel and values of their diagonally corresponding pixels. The direction determination unit determines a direction of a slant line representing the edge included in the input pixel.

According to another aspect of the present invention, there is provided an apparatus for enhancing the quality of reproduced images, including an interpolation unit. The interpolation unit obtains an interpolated pixel value using values of upper three cells and lower three pixels with respect to an input pixel, which belong to the same row of an odd field that the input pixel belongs to but different even fields from one another, when an edge included in the input pixel is determined to belong to a vertical area, and obtains the interpolated pixel value using values of four pixels diagonally adjacent to the input pixel when the edge included in the input pixel is determined to belong to a slant line area.

According to another aspect of the present invention, there is provided a method of enhancing the quality of reproduced images, which involves (a) determining whether or not an edge included in an input pixel belongs to a vertical area; (b) determining whether or not there is a possibility of the edge forming a slant line when the edge is determined to not belong to the vertical area; (c) determining a direction of the slant line when the edge is determined to possibly form the slant line; and (d) calculating an interpolated pixel value for the input pixel based on the determination results, obtained in (a), (b), and (c).

According to another aspect of the present invention, there is provided a method of enhancing the quality of reproduced images, which involves (h) determining whether or not an interlaced-scanned input pixel is the one to be interpolated; (i) determining whether or not an edge included in the input pixel belongs to a slant line area when the input pixel is determined to be the one to be interpolated; and (j) obtaining an interpolated pixel value for the input pixel based on the determination result, obtained in (i), by using values of pixels adjacent to the input pixel and designating the interpolated pixel value as an output pixel value.

According to another aspect of the present invention, there is provided a method of enhancing the quality of reproduced images, which involves (s) determining that an edge included in an input pixel may have a slant-line shape when differences between values of two pixels, arranged at each side of the upper pixel, and values of their vertically corresponding pixels are smaller than a difference between upper and lower pixels with respect to the input pixel and are obtained using two pixels, located at one side of the upper pixel, and values of their vertically corresponding pixels; and (t) determining a direction of a slant line representing the edge included in the input pixel.

According to another aspect of the present invention, there is provided a method of enhancing the quality of reproduced images, which involves (u) determining that an edge included in an input pixel may have a slant-line shape when differences between values of two pixels, arranged at one side of the upper pixel, and values of their diagonally corresponding pixels are smaller than differences between values of two pixels located at the other side of the upper pixel and values of their diagonally corresponding pixels; and (v) determining a direction of a slant line representing the edge included in the input pixel.

According to another aspect of the present invention, there is provided a method of enhancing the quality of reproduced images, which involves obtaining an interpolated pixel value using values of upper three cells and lower three pixels with respect to an input pixel, which belong to the same row of an odd field that the input pixel belongs to but different even fields from one another, when an edge included in the input pixel is determined to belong to a vertical area, and obtaining the interpolated pixel value using values of four pixels diagonally adjacent to the input pixel when the edge included in the input pixel is determined to belong to a slant line area.

BRIEF DESCRIPTION OF THE DRAWINGS

The above and other features and advantages of the present invention will become more apparent by describing in detail exemplary embodiments thereof with reference to the attached drawings in which:

FIG. 3A is a detailed block diagram of an apparatus for enhancing the quality of reproduced images according to a second embodiment of the present invention;

FIG. 4 is a diagram illustrating an interpolation process;

DETAILED DESCRIPTION OF THE INVENTION

Figure 1:
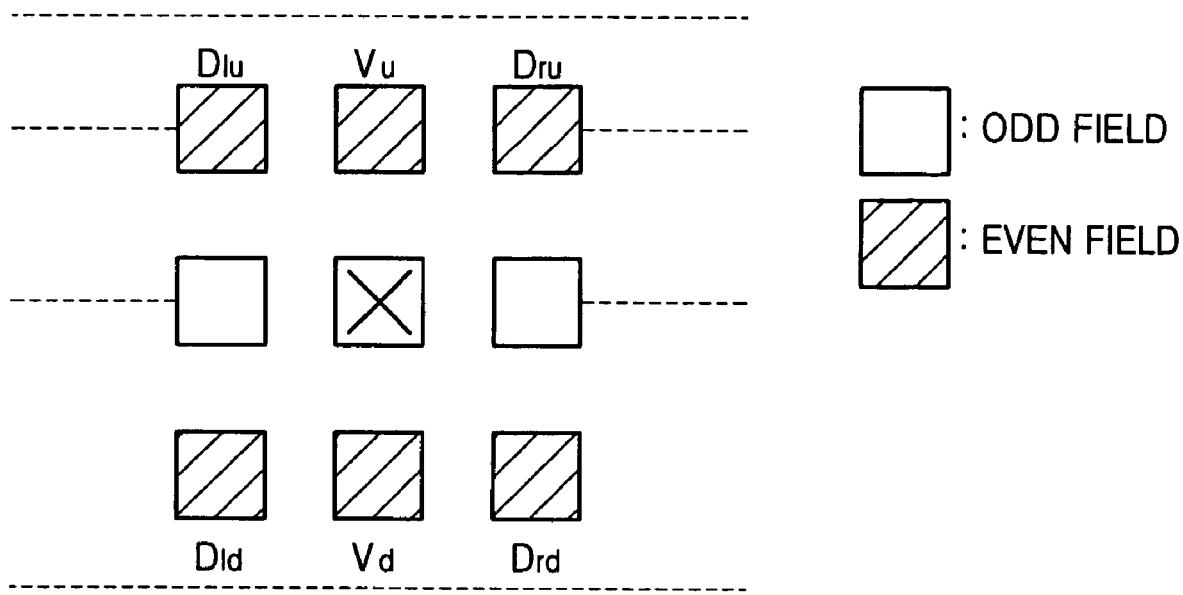
FIG. 1 is a diagram illustrating a conventional edge-dependent interpolation method.

Hereinafter, the present invention will be described in greater detail with reference to the accompanying drawings in which preferred embodiments of the invention are shown. The same reference numerals in different drawings represent the same elements.

Figure 2:
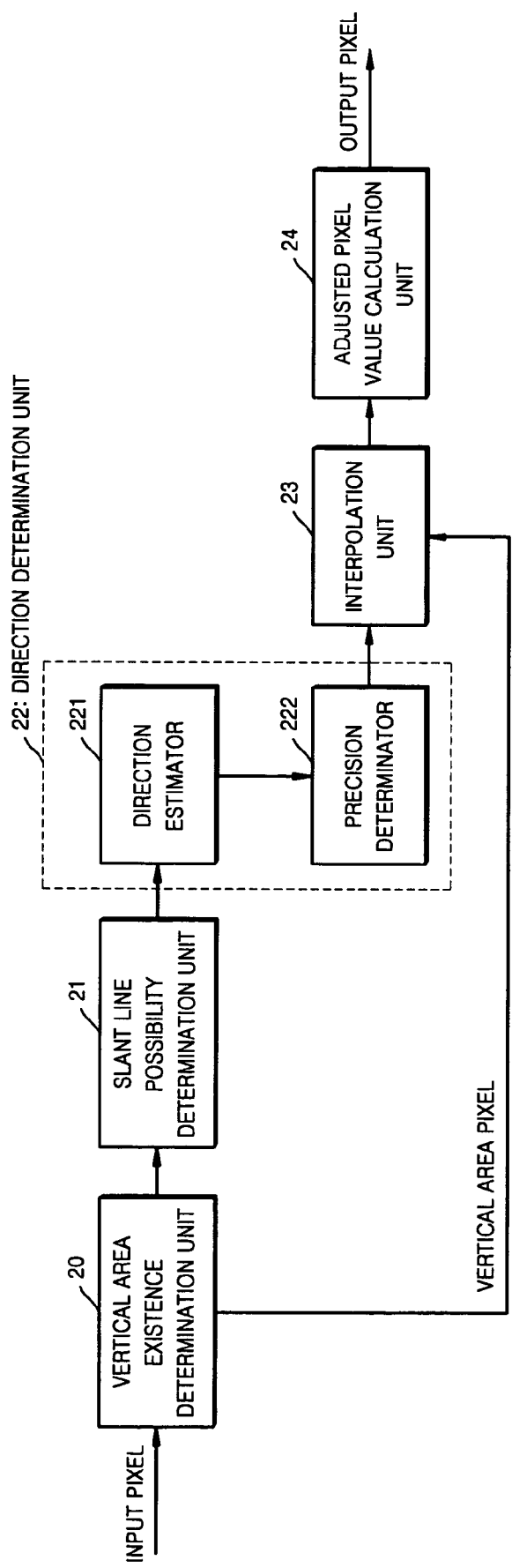
FIG. 2 is a block diagram of an apparatus for enhancing the quality of reproduced images according to a first embodiment of the present invention.

FIG. 2 is a block diagram of an apparatus for enhancing the quality of reproduced images according to a first embodiment of the present invention. Referring to FIG. 2, a vertical area existence determination unit 20 determines whether an input pixel exists in a vertical area. More specifically, if the difference between the values of pixels vertically adjacent to the input pixel is smaller than a predetermined threshold value, the vertical area existence determination unit 20 determines that the input pixel exists in the vertical area. Otherwise, the vertical area existence determination unit 20 determines that the input pixel may possibly exist in a slant line area. Here, if the input pixel belongs to the slant line area, it is supposed to an edge.

When the input pixel is determined to exist in the vertical area, an interpolation unit 32 carries out interpolation on the input pixel, which will be described later.

When the input pixel does not exist in the vertical area, a slant line possibility determination unit 21 could determine whether there is a possibility of the input pixel existing in the slant line area in two different manners. More specifically, the slant line possibility determination unit 21 determines whether or not the input pixel exists in the slant line area using the difference between the values of lower left and upper left pixels with respect to the input pixel and the difference between the values of lower right and upper right pixels to the input pixel or using the difference between the lower left pixel value and the upper right pixel value and the difference between the upper left pixel value and the lower right pixel value. These two methods will become more apparent in the following paragraphs.

When the slant line possibility determination unit 21 determines that an edge included in the input pixel may form a slant line, a direction determination unit 22 determines which direction the edge is tilted toward. The direction determination unit 22 includes a direction estimator 221, which estimates the direction toward which the edge having a slant line shape is tilted, and a precision determiner 222, which determines the precision of the estimation. The operations of the direction estimator 221 and the precision determiner 222 will be described in greater detail later with a preferred embodiment of the first method of the present invention.

When the direction, toward which the edge included in the input pixel is tilted, is determined by the direction determination unit 22, an interpolation unit 23 calculates an interpolated value of the input pixel based on the determined direction. The interpolated value of the input pixel is preferably calculated through interpolation using the values of a plurality of pixels vertically and/or diagonally adjacent to the input pixel, a process which will be described in greater detail later.

The first embodiment of FIG. 2 may further include an adjusted pixel value calculation unit 24, which compares the interpolated value of the input pixel with the original input pixel value and obtains an adjusted pixel value for the input pixel based on the comparison result.

In general, when the above-described interpolation process is complete, an entire process of converting an interlaced image into a progressive image is over. The adjusted pixel value calculation unit 24 helps deal with an image containing many fast motions. In the case of an image containing many fast motions, there is generally a huge saturation difference among fields. Therefore, when there is only a small difference between the original input pixel value and the interpolated pixel value, it is more preferable to use the original input pixel value as a final pixel value in terms of the quality of a reproduced image. The adjusted pixel value calculation unit 24 designates the interpolated pixel value as the final pixel value only when there is a huge difference between the original input pixel value and the interpolated pixel value, a process which will also be described in greater detail later.

FIG. 3A is a detailed block diagram of an apparatus for enhancing the quality of reproduced images according to a second embodiment of the present invention. Referring to FIG. 3A, a pixel-to-be-interpolated determination unit 30 determines whether an interlaced-scanned input pixel is subjected to interpolation. In the pixel-to-be-interpolated determination unit 30, an existence field determination unit 301 determines whether the interlaced-scanned input pixel belongs to an odd field or an even field so that pixels in either odd fields or even fields of an interlaced-scanned input pixel can be directly used as output pixels. As described above, in a conventional method of enhancing the quality of reproduced images, the saturation value of an original image can never be used until it is processed in a certain manner even when there is no big difference between the saturation value of the original image and the saturation value of a corresponding progressive image. Therefore, this conventional image conversion method has a serious problem in terms of the quality of reproduced progressive images.

In the present invention, unlike in the prior art, both odd and even fields of an interlaced image can be used together to solve the problem of the prior art. Whether pixels in odd fields or even fields are to be directly used as output pixels is a matter of selection. From now on, the operation of the apparatus for enhancing the quality of reproduced images according to a second embodiment of the present invention will be described in even greater detail on the assumption that pixels in even fields of an interlaced image are directly used as output pixels. However, the way the apparatus for enhancing the quality of reproduced images according to a second embodiment of the present invention operates does not change depending on whether or not pixels in even fields or in odd fields are to be directly used as output pixels.

If the input pixel belongs to an odd field, a field selection processing unit 302 classifies the input pixel as the one to be interpolated. If the input pixel belongs to an even field, the field selection processing unit 302 designates the value of the input pixel as a value of a corresponding output pixel of a progressive image.

If the input pixel is classified as the one to be interpolated, an existence area determination unit 31 determines whether the input pixel belongs to a vertical area or a slant line area. The existence area determination unit 31, which is one of the most important technical features of the present invention, has already been described above.

Here, the vertical area indicates a 'single subject' area, and the slant line area indicates a 'plural subjects' area. When the input pixel is located in the 'plural subjects' area, it includes an edge.

The existence area determination unit 31 determines first whether or not the input pixel exists in the vertical area. In other words, a vertical area existence determination unit 20 in the existence area determination unit 31 determines that the input pixel exists in the vertical area if the difference between two pixels vertically adjacent to the input pixel and belonging to different columns from the input pixel is smaller than a predetermined threshold value. Otherwise, the vertical area existence determination unit 20 determines that the input pixel exists in the slant line area. The predetermined threshold value is determined through experiments, as described above. When the input pixel is determined to exist in the vertical area, an interpolation unit 23 performs interpolation on the input pixel.

Figure 3B:
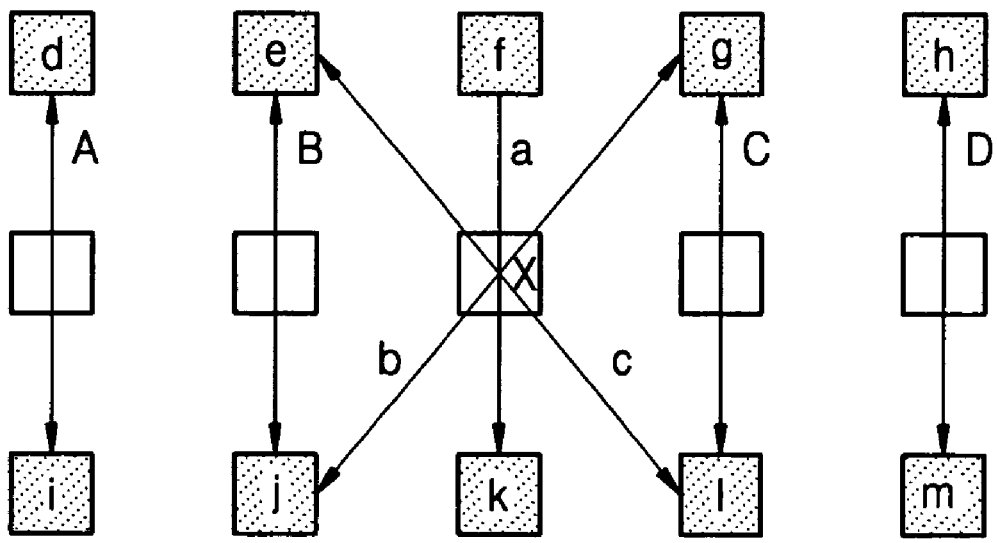
FIG. 3B is a diagram illustrating processes of determining whether an edge included in an input pixel forms a slant line and determining the direction of the slant line according to a preferred embodiment of the present invention.

When the input pixel is determined to exist in an area other than the vertical area (i.e., when the difference between the pixels vertically adjacent to the input pixel is greater than the predetermined threshold value), a slant line possibility determination unit 21 determines whether or not the edge included in the input pixel forms a slant line. Referring to FIG. 3B, the slant line possibility determination unit 21 preferably determines whether there is a possibility of the edge included in the input pixel forming a slant line by using a plurality of pixels adjacent to the input pixel, i.e., pixels f and k, which are vertically adjacent to the input pixel X, pixels d, e, g and h, which are horizontally adjacent to the pixel f and belong to the same even field that the pixel f belongs to, and pixels i, j, l and m, which are horizontally adjacent to the pixel k belonging to the same even field that the pixel k belongs to.

More specifically, the slant line possibility determination unit 21 determines that the edge included in the input pixel is more likely to form a slant line when some of differences A, B, C, and D between the values of pixels d and i, between the values of pixels e and j, between the values of pixels g and l, and between the values of pixels h and m are not smaller than a predetermined threshold value and are obtained using pixels located at one side of the upper pixel f and their corresponding pixels. For example, even when A and C are not smaller than the predetermined threshold value, the slant line possibility determination unit 21 does not determine that the edge included in the input pixel is likely to form a slant line because the pixels d and i are hardly adjacent to the pixels e and l, respectively. On the contrary, when C and D are not smaller than the predetermined threshold value, the slant line possibility determination unit 21 determines that the edge included in the input pixel is likely to form a slant line because the pixels e and l are adjacent to the pixels h and m, respectively.

Figure 3C:
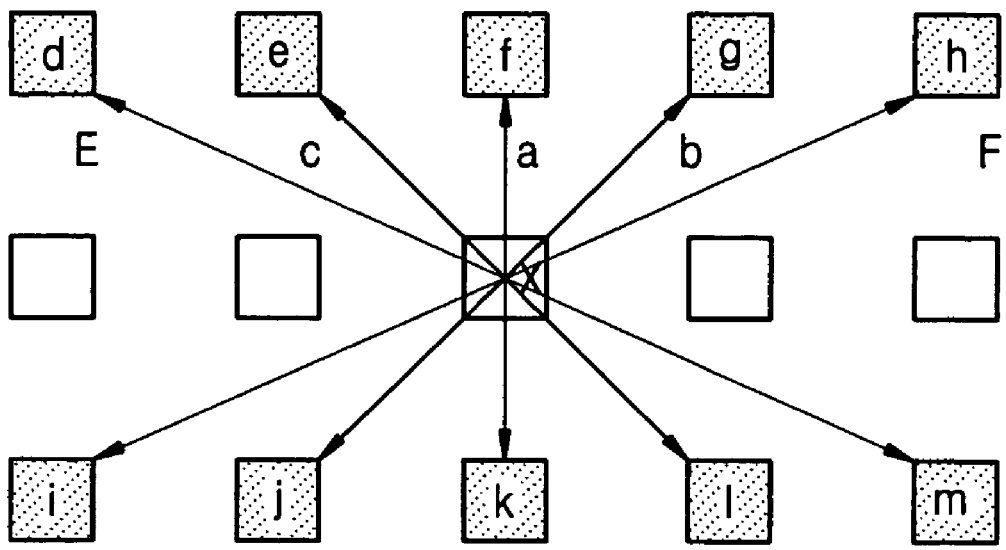
FIG. 3C is a diagram illustrating processes of determining whether an edge included in an input pixel forms a slant line and determining the direction of the slant line according to another preferred embodiment of the present invention.

Alternatively, the slant line possibility determination unit 21 may determine whether or not the edge included in the input pixel X forms a slant line by using a difference between the values of every two pixels which belong to different even fields, i.e., an upper even field and a lower even field, respectively, with respect to the odd field that the input pixel X belongs to, but diagonally correspond to each other with the input pixel X therebetween. More specifically, as shown in FIG. 3C, the slant line possibility determination unit 21 uses differences a, b, c, E and F between the values of the pixels f and k, between the values of the pixels g and j, between the values of the pixels e and l, between the values of the pixels d and m, and between the values of the pixels h and i. When two smaller ones among a, b, c, E, and F are c and E or b and F, the slant line possibility determination unit 21 determines that there is a possibility of the edge included in the input pixel forming a slant line.

When there is a possibility of the edge included in the input pixel forming a slant line, a direction determination unit 22 determines the direction of the slant line. In the direction determination unit 22, a direction estimator 221 estimates the direction of the slant line, and a precision determiner 222 determines how precise the estimated direction of the slant line is.

The estimation of the direction of the slant line is preferably carried out using a plurality of pixels adjacent to the input pixel. In a case where whether or not there is a possibility of the edge included in the input pixel forming a slant line is determined using the above-described method that is apparent in FIG. 3B, the direction estimator 221 uses differences b and c between the values of the pixels e and l and between the values of the pixels e and j. More specifically, when a difference b−c between b and c is smaller than or greater than 0, i.e., when b is smaller than c or vice versa, the direction estimator 221 may determine that the slant line extends along a 'b' or 'c' direction. This condition, however, may not be sufficient enough to determine the slant line to extend along the 'b' or 'c' direction because when there is only a small difference between b and c, it is very likely to end up in a wrong estimate of the direction of the slant line even though the slant line possibility determination unit 21 has already determined that the input pixel belongs to the slant line area. Due to the wrong estimation of the direction of the slant line, colors of an output image may spread undesirably.

Therefore, in order to estimate the direction of the slant line to extend along the 'b' or 'c' direction, two more conditions that |b−c| is not smaller than a predetermined threshold value and that |b−a|= or |c−a| is not smaller than a predetermined threshold value should be met. Here, 'a' represents a difference between the values of the upper and lower pixels, and these threshold values are determined through experiments. If none of the above three conditions is satisfied or if b is equal to c, the input pixel is determined to exist in the vertical area.

Referring to FIG. 3C, if the edge included in the input pixel is determined to form a slant line in the above-described method that is apparent in FIG. 3C, the direction estimator 221 determines the slant line to be tilted rightward or leftward when two smaller ones among differences b, c, E, and F between the values of the pixels g and j, between the values of the pixels e and l, between the values of the pixels d and m, and between the values of the pixels h and i are c and F or b and F.

However, this condition may not be sufficient enough to determine the slant line to be tilted rightward or leftward because when a difference between a and b, between a and F, between a and c, or between a and E is very small but a difference between b and F or between c and E is very large, it is very likely to end up in a wrong estimate of the direction of the slant line even though the slant line possibility determination unit 21 has already determined that the input pixel belongs to an area other than the vertical area. Due to the wrong estimation of the direction of the slant line, colors of an output image may spread undesirably.

Therefore, in order to determine the slant line to be tilted rightward, two more conditions that the difference between a and any one of b, c, E, and F is greater than a predetermined threshold value and that |b−F| or |c−E| is not greater than another predetermined threshold value should be satisfied. Here, these two predetermined threshold values are determined through experiments. If none of the above three conditions is satisfied or if c is equal to E or b is equal to F, the input pixel is determined to exist in the vertical area.

Figure 3D:
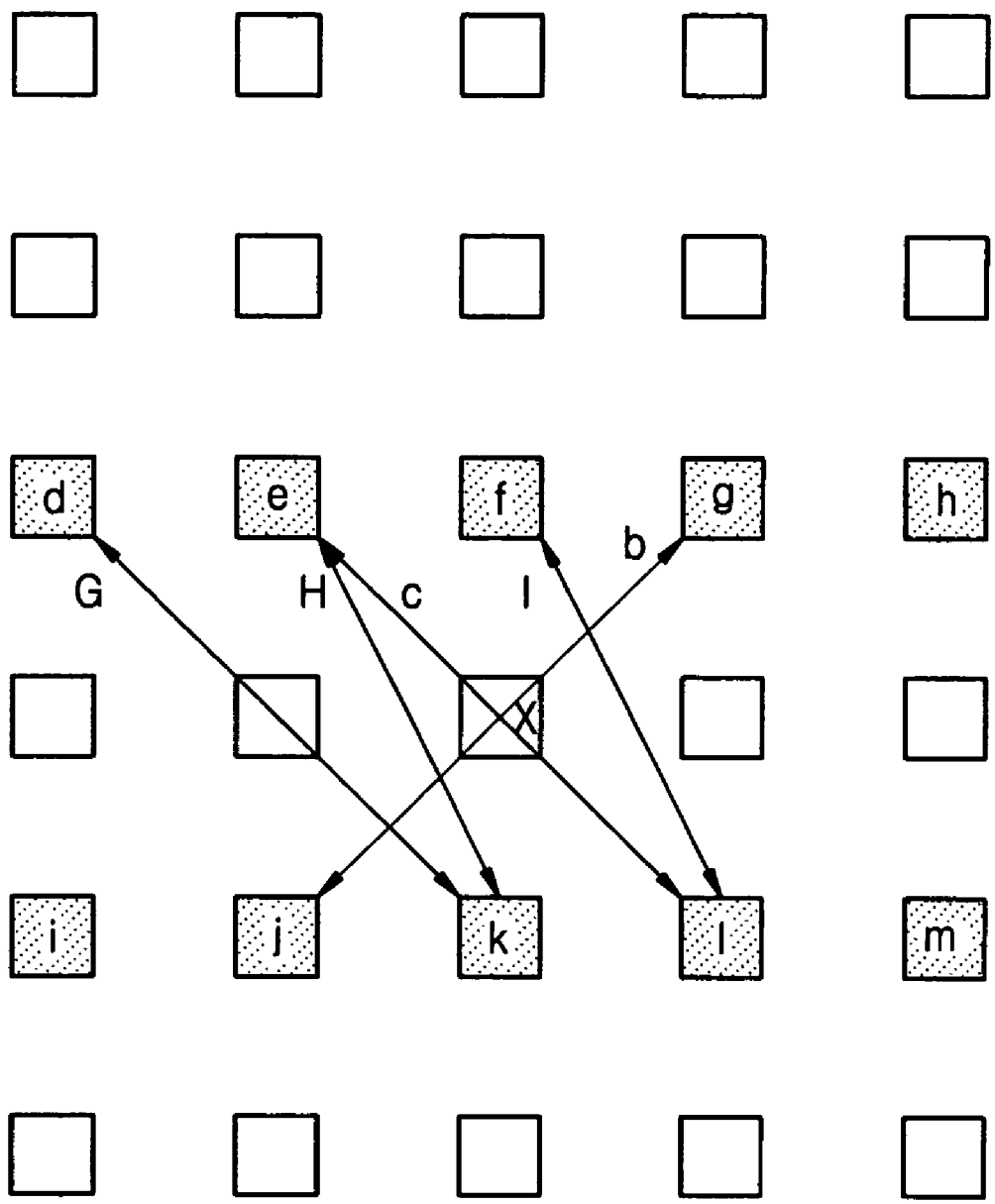
FIG. 3D is a diagram illustrating a process of determining how precise the estimation of the direction of a slant line is when the slant line is determined to be tilted rightward.
Figure 3E:
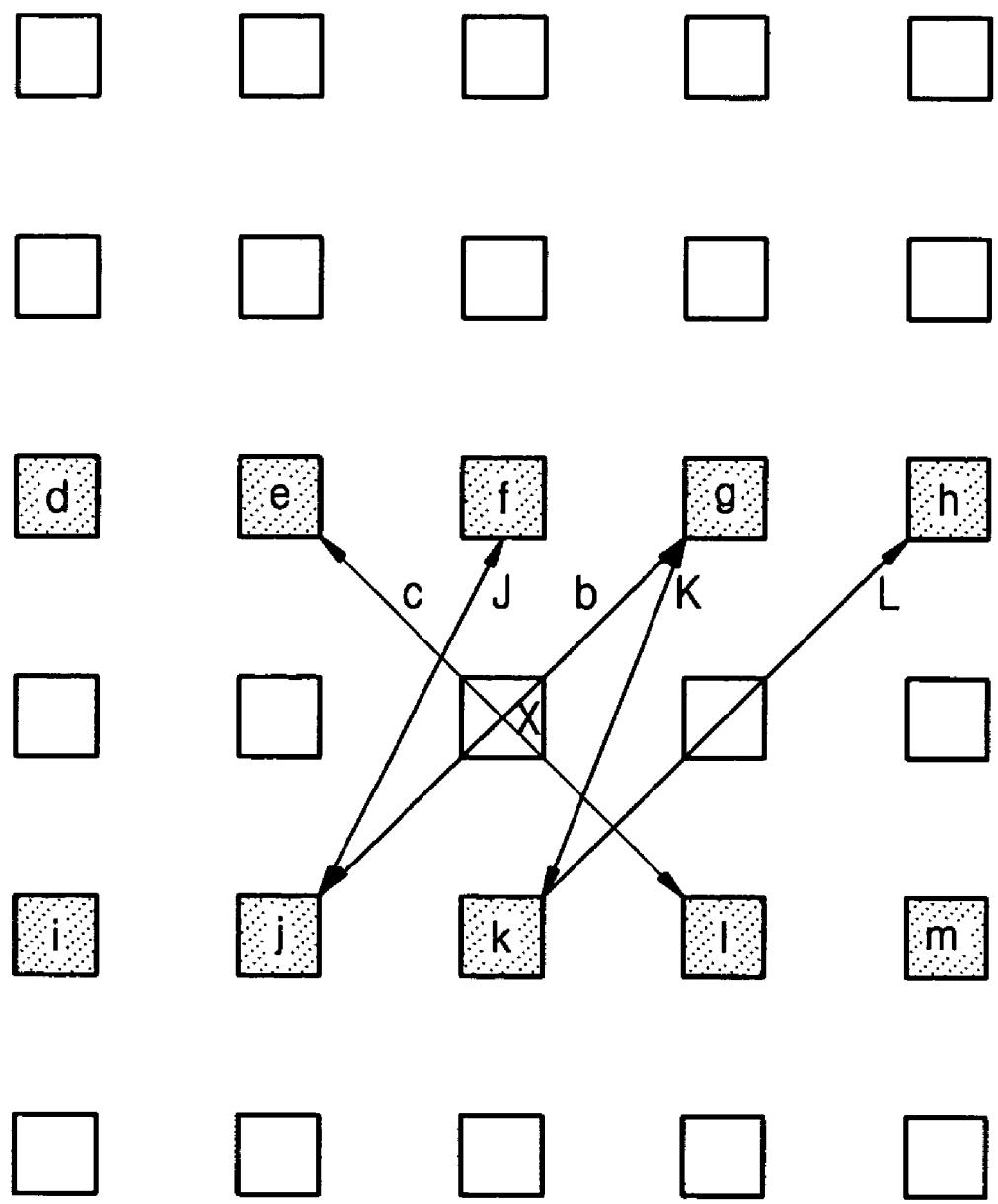
FIG. 3E is a diagram illustrating a process of determining how precise the estimation of the direction of a slant line is when the slant line is determined to be tilted leftward.

When the estimation of the direction of the slant line is complete, the precision determiner 222 preferably determines how precise the estimated direction of the slant line is by using a plurality of pixels adjacent to the input pixel, a process which becomes more apparent in FIGS. 3D and 3E. FIG. 3D illustrates a case where the slant line is tilted rightward extending along a 'b' direction, and FIG. 3E illustrates a case where the slant line is tilted leftward extending along a 'c' direction.

Referring to FIG. 3D, when the direction estimator 221 estimates the slant line to be tilted rightward or leftward, the precision determiner 222 calculates differences G, H, c, and l (l−k, e−k, e−l, and f−l) between the values of the pixels l and k, between the values of the pixels e and k, between the values of the pixels e and l, and between the values of the pixels f and l.

The precision determiner 222 determines that the estimation of the direction of the slant line, carried out by the direction estimator 221, is precise if l−k, e−k, e−l, and f−l are not smaller than a predetermined threshold value. Otherwise, the precision determiner 222 determines that the input pixel exists in the vertical area. The corresponding threshold value is determined through experiments.

The interpolation unit 23 calculates an interpolated value of the input pixel based on the estimated direction of the slant line. Interpolation is preferably carried out using a plurality of pixels vertically and/or diagonally adjacent to the input pixel to obtain the interpolated pixel value.

Referring to FIG. 4, when the input pixel X is determined to belong to the vertical area, the interpolated pixel value is obtained using the values of pixels h of, k, p, and q, which belong to the same column as the input pixel X but different odd fields from one another. On the other hand, when the input pixel X is determined to belong to the slant line area, the interpolated pixel value is obtained using the values of the upper and lower pixels f and k and the pixels e, g, j, and l diagonally adjacent to the input pixel X.

Specifically, when the input pixel X exists in the vertical area, the interpolated pixel value X' can be obtained using Equation (1) below. When the input pixel X exists in the slant line area and a slant line representing an edge included in the input pixel is tilted rightward, the interpolated pixel value X' can be obtained using Equation (2) below. When the input pixel X exists in the slant line area and the slant line is tilted leftward, the interpolated pixel value X' can be obtained using Equation (3) below.

$$X'=20*(f+k)-5*(o+p)+n+q \quad (1)$$

$$X'=g+j \quad (2)$$

$$X'=e+l \quad (3)$$

Equations (1), (2), and (3) are experimentally determined. The interpolated pixel value X' is typically obtained through 2-tab filtering or 6-tab filtering. In the 6-tab filtering method, the interpolated pixel value X' is calculated using 6 adjacent pixels to the input pixel X, which is expressed by Equation (1). On the other hand, in the 2-tab filtering method, the interpolated pixel value X' is calculated using two adjacent pixels to the input pixel X, which is expressed by Equation (2) or (3).

The apparatus for enhancing the quality of reproduced images according to the second embodiment of the present invention may further include an adjusted pixel value calculation unit 24, which adjusts a value of an output pixel by comparing the interpolated pixel value X' with the original input pixel value.

In general, when the above-described interpolation process is complete, it is safe to say that an entire process of converting an interlaced image into a progressive image is over. In the case of an image containing many or fast motions, there is a huge saturation difference among fields in which case it is effective to use interpolated pixel values. However, in the case of an image rarely containing motions, it is effective to use original input pixel values of an interlaced-scanned image together with a few interpolated pixel values in terms of the minimization of damage to the saturation of an original image. The adjusted pixel value calculation unit 24 adjusts the value of an output pixel using Equation (4) below.

if $Src[x]-X'$<threshold value, then $Dst[x] \leftarrow Src[x]$ else if $Src[x]-X'$>threshold value, then $Dst[x] \leftarrow X'$ \quad (4)

In Equation (4), X', Src[x], and Dst[x] represent an interpolated value of the input pixel X, an original value of the input pixel X, and a value of the output pixel, respectively. In Equation (4), a threshold value threshold value used in Equation (4) is experimentally determined. Equation (4) shows that if there is only a small difference between the original input pixel value Src[x] and the interpolated pixel value X', the original input pixel value Src[x] can be used as the final pixel value Dst[x] and if there is a huge difference between the original input pixel value Src[x] and the interpolated pixel value X', the interpolated pixel value X' is used as the final pixel value Dst[x].

In other words, if an interpolated pixel value obtained for an input pixel of an interlaced image, which belongs to an odd field, is not much different from an original value of the input pixel, the original input pixel value is used as a final pixel value.

An apparatus for enhancing the quality of reproduced images according to a third embodiment of the present invention includes the slant line possibility determination unit 21 and the direction determination unit 22. The apparatus for enhancing the quality of reproduced images according to the third embodiment of the present invention is capable of reducing the possibility of errors occurring in the process of determining the direction of a slant line that represents an edge included in a predetermined input pixel and thus enhancing the quality of reproduced images. Since the apparatus for enhancing the quality of reproduced images according to the third embodiment of the present invention is almost the same as its counterpart according to the first embodiment of the present invention, its description will not be repeated here.

An apparatus for enhancing the quality of reproduced images according to a fourth embodiment of the present invention includes the slant line possibility determination unit 21 and the direction determination unit 22. The apparatus for enhancing the quality of reproduced images according to the fourth embodiment of the present invention is capable of reducing the possibility of errors occurring in the process of determining the direction of a slant line that represents an edge included in a predetermined input pixel and thus enhancing the quality of reproduced images. Since the apparatus for enhancing the quality of reproduced images according to the fourth embodiment of the present invention is almost the same as its counterpart according to the second embodiment of the present invention, its description will not be repeated here.

An apparatus for enhancing the quality of reproduced images according to a fifth embodiment of the present invention includes the interpolation unit 23 and the adjusted pixel value calculation unit 24. The apparatus for enhancing the quality of reproduced images according to the fifth embodiment of the present invention is capable of reducing the possibility of errors occurring in the process of determining the direction of a slant line that represents an edge included in a predetermined input pixel and thus enhancing the quality of reproduced images. Since the apparatus for enhancing the quality of reproduced images according to the fourth embodiment of the present invention is almost the same as its counterparts according to the first and second embodiments of the present invention, its description will not be repeated here.

Figure 5:
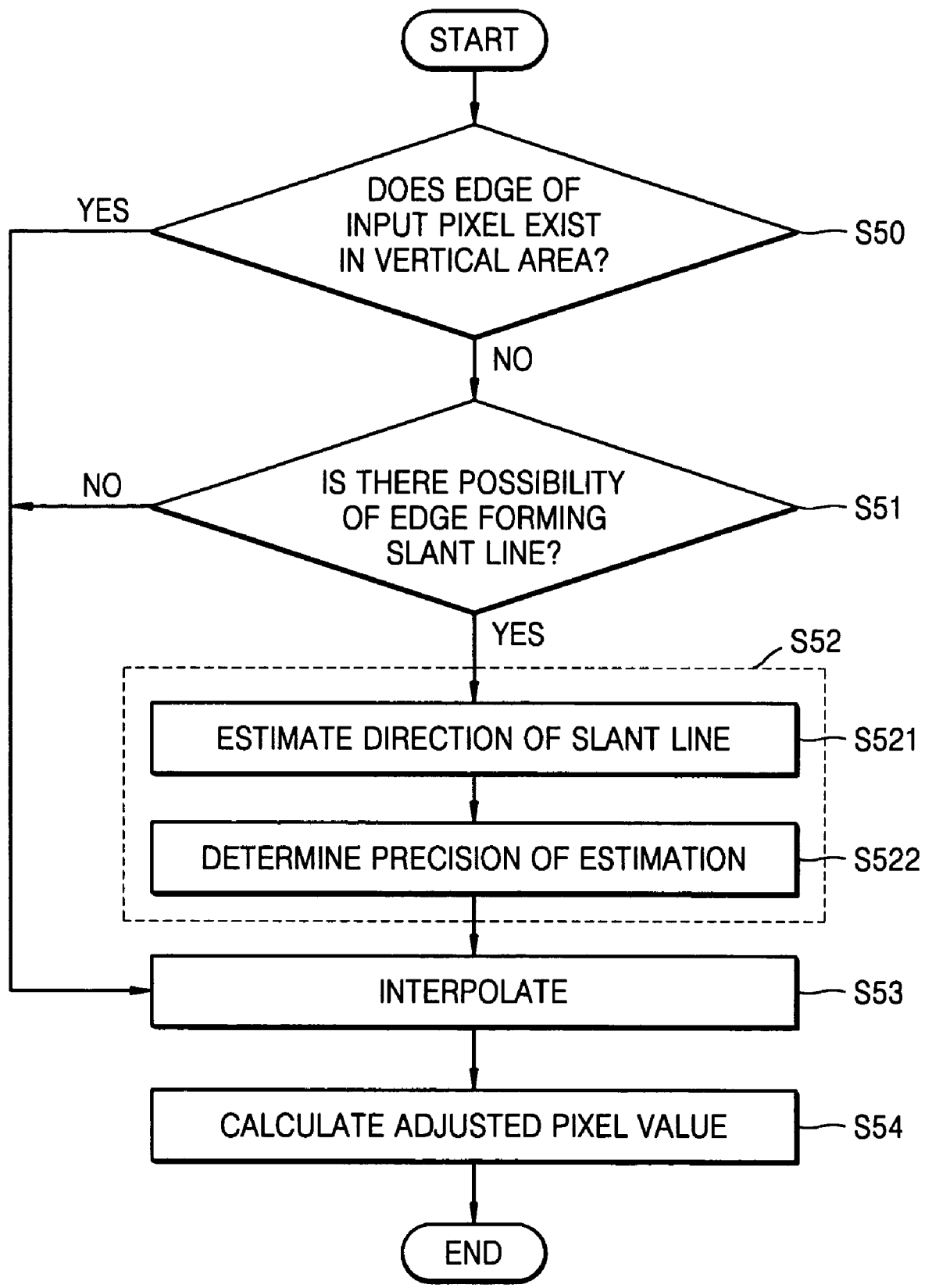
FIG. 5 is a flowchart of a method of enhancing the quality of reproduced images according to a first embodiment of the present invention.

FIG. 5 is a flowchart of a method of enhancing the quality of reproduced images according to a first embodiment of the present invention. Referring to FIG. 5, it is determined whether or not a predetermined input pixel exists in a vertical area in step S50. Specifically, if a difference between the values of pixels vertically adjacent to the input pixel is smaller than a predetermined threshold value, the input pixel is determined to exist in the vertical area. Otherwise, the input pixel is determined to exist in a slant line area.

The predetermined threshold value and the extent, to which each of the two pixels vertically adjacent to the input pixel is distant from the input pixel, are determined through experiments. If the input pixel is determined to belong to the vertical area, interpolation is carried out on the input pixel in step S53.

If the input pixel is determined to belong to an area other than the vertical area, it is determined whether or not an edge included in the input pixel forms a slant line in step S51. Preferably, differences between the values of upper right and lower right pixels with respect to the input pixel and between the values of upper left and lower left pixels with respect to the input pixel are used in step S51, which is called a first manner. Alternatively, differences between the values of every two pixels which belong to different fields, i.e., an upper field and a lower field, respectively, with respect to the field that the input pixel belongs to, but diagonally correspond to each other with the input pixel therebetween may be used in step S51, which is called a second manner. These two manners have already been described above, and thus their description will not be repeated here.

When there is a possibility of the edge included in the input pixel forming a slant line, a direction of the slant line is determined in step S52. More specifically, the direction of the slant line is estimated in step S521, and then it is determined in step S522 how precise the estimated direction of the slant line is. Steps S521 and S522 will be described in greater detail later.

When the direction of the slant line is determined, an interpolated pixel value is calculated through interpolation in step S53. Preferably, the interpolated pixel value is obtained using a plurality of pixels vertically and/or diagonally adjacent to the input pixel, a process which will be described in greater detail later.

The method of enhancing the quality of reproduced images according to the first embodiment of the present invention may further involve calculating an adjusted value of an output pixel corresponding to the input pixel by comparing the interpolated pixel value with an original input pixel value (in step S54).

In general, when the above-described interpolation process is complete, it is safe to say that an entire process of converting an interlaced image into a progressive image is over. However, step S54 can still be meaningful for the same reason that has been described above as justifying the introduction of the adjusted pixel value calculation unit 24 into the apparatus for enhancing the quality of reproduced images according to the first or second embodiment of the present invention. In step S54, if there is only a small difference between the original input pixel value and the interpolated pixel value, it is more preferable to use the original input pixel value as a final pixel value. Otherwise, the interpolated pixel value is designated as the final pixel value, a process which will also be described in greater detail later.

Figure 6:
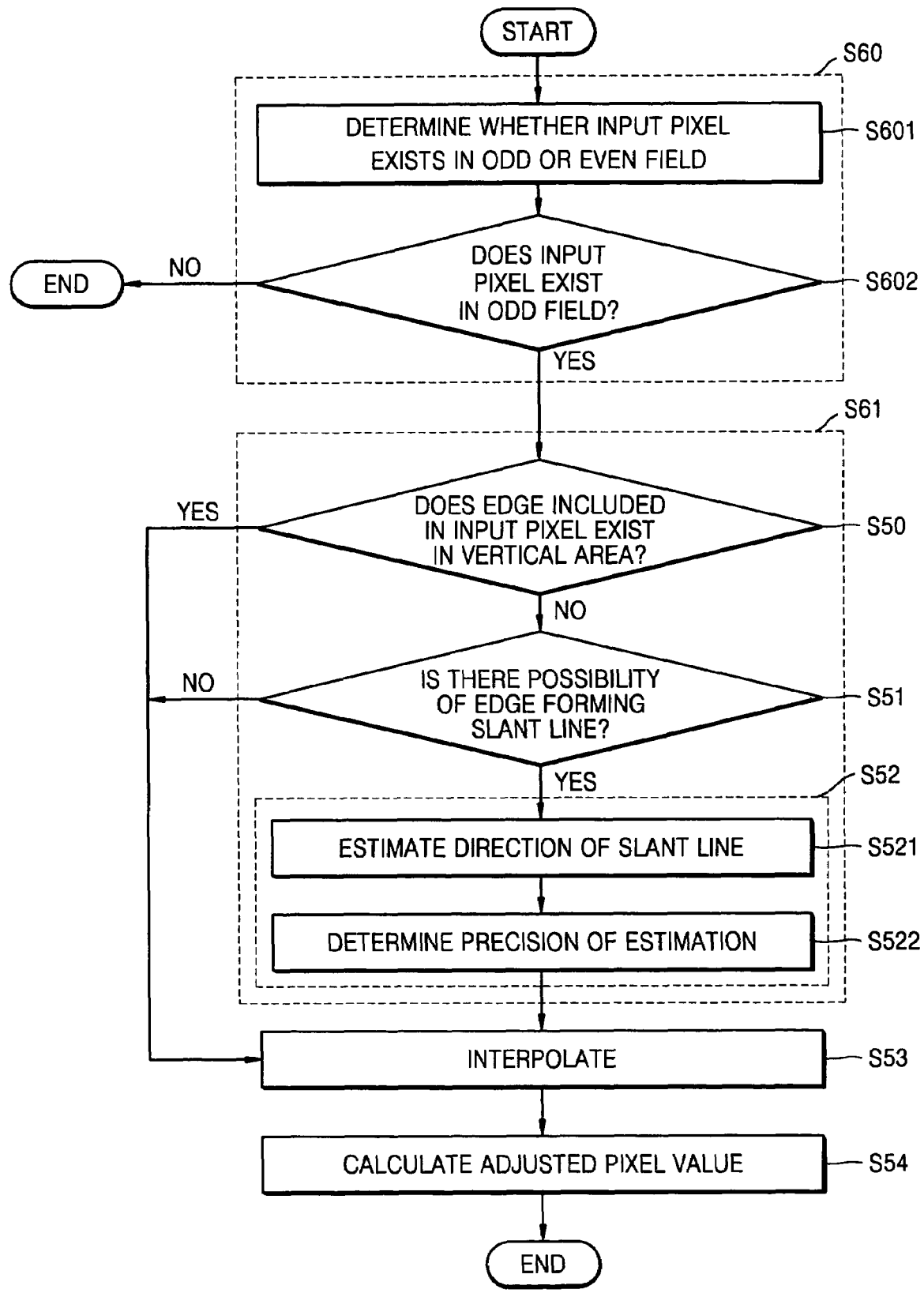
FIG. 6 is a detailed flowchart of a method of enhancing the quality of reproduced images according to a second embodiment of the present invention.

FIG. 6 is a detailed flowchart of a method of enhancing the quality of reproduced according to a second embodiment of the present invention. Referring to FIG. 6, it is determined whether or not an interlaced-scanned input pixel is the one to be interpolated. More specifically, in step S601, it is determined whether the interlaced-scanned input pixel belongs to an odd field or an even field. The reason why it should be determined first whether or not the input pixel belongs to either an odd field or an even field has been described above.

As described above, whether pixels in odd fields or even fields are to be directly used as output pixels is a matter of selection. From now on, the method of enhancing the quality of reproduced images according to the second embodiment of the present invention will be described in even greater detail based on the assumption that pixels in even fields of an interlaced-scanned image are directly used as output pixels. However, the method of enhancing the quality of reproduced images does not change depending on whether or not pixels in even fields or in odd fields are to be directly used as output pixels.

If the input pixel belongs to an odd field, the input pixel is classified as the one to be interpolated in step S602. If the input pixel belongs to an even field, the value of the input pixel is designated as a value of a corresponding output pixel of a sequential-scanned image.

If the input pixel is classified as the one to be interpolated, it is determined whether the input pixel belongs to a vertical area or a slant line area in step S61. Step S61 is considered as dealing with one of the most important technical features of the present invention. In addition, step S61 corresponds to the operation of the existence area determination unit 31 that has been described above. Here, the vertical area and the slant line area have already been described above and thus their description will not be repeated here.

In step S61, it is determined first whether or not the input pixel exists in the vertical area. In other words, in step S50, the input pixel is determined to exist in the vertical area if a difference between two pixels, vertically adjacent to the input pixel and belonging to different fields from the input pixel, is smaller than a predetermined threshold value. Otherwise, the input pixel is determined to exist in the slant line area. The predetermined threshold value is determined through experiments, as described above, and is preferably very small. When the input pixel is determined to exist in the vertical area, interpolation is performed on the input pixel in step S53, as described above.

When the input pixel is determined to exist in an area other than the vertical area (i.e., when the difference between the two pixels vertically adjacent to the input pixel is greater than the predetermined threshold value), it is determined whether or not the edge included in the input pixel forms a slant line. Referring back to FIG. 3B, it is preferably determined whether or not there is a possibility of the edge included in the input pixel forming a slant line by using a plurality of pixels adjacent to the input pixel, i.e., pixels l and k, which are vertically adjacent to the input pixel X, pixels d, e, e and h, which are horizontally adjacent to the pixel l and belong to the same even field that the pixel l belongs to, and pixels i, j, l and m, which are horizontally adjacent to the pixel k belonging to the same even field that the pixel k belongs to.

More specifically, the edge included in the input pixel is determined to have a slant-line shape when some of differences A, B, C, and D between the values of the pixels d and i, between the values of the pixels e and j, between the values of the pixels e and l, and between the values of the pixels h and m are not smaller than a predetermined threshold value and their corresponding pixels are adjacent to one another. For example, even when A and C are not smaller than the predetermined threshold value, the edge included in the input pixel is determined to be less likely to have a slant-line shape because the pixels d and i are hardly adjacent to the pixels e and l, respectively. On the contrary, when C and D are not smaller than the predetermined threshold value, the edge included in the input pixel is determined to be more likely to have a slant-line shape because the pixels e and l are adjacent to the pixels h and m, respectively.

Alternatively, it may be differently determined whether or not the edge included in the input pixel has a slant-line shape by using a difference between the values of every two pixels which vertically or diagonally correspond to each other with the input pixel X therebetween. More specifically, as shown in FIG. 3C, differences a, b, c, E and F between the values of the pixels f and k, between the values of the pixels g and j, between the values of the pixels e and l, between the values of the pixels d and m, and between the values of the pixels h and i can be used to determine whether or not the edge included in the input pixel has a slant-line shape. When two smaller ones among a, b, c, e and F are c and E or b and F, it is determined that there is a possibility of the edge included in the input pixel having a slant-line shape.

When there is a possibility of the edge included in the input pixel forming a slant line, a direction of the slant line is determined in step S52. More specifically, in step S521, the direction of the slant line is estimated, and in step S522, it is determined how precise the estimated direction of the slant line is.

The estimation of the direction of the slant line is preferably carried out using a plurality of pixels adjacent to the input pixel. In a case where whether or not there is a possibility of the edge included in the input pixel forming a slat line is determined using the above-described method that is apparent in FIG. 3B, differences b and c between the values of the pixels e and l and between the values of the pixels e and j are used to determine the direction of the slant line. More specifically, when a difference (b–c) between b and c is smaller than or greater than 0, i.e., when b is smaller than c or vice versa, the slant line is determined to extend along a 'b' or 'c' direction. This condition, however, may not be sufficient enough to determine the slant line to extend along the b or c direction because when there is only a small difference between b and c, it is very likely to end up in a wrong estimate of the direction of the slant line even though the input pixel has been already determined in step S51 to belong to the slant line area. Due to the wrong estimation of the direction of the slant line, colors of an output image may spread undesirably.

Therefore, in order to estimate the direction of the slant line to extend along the 'b' or 'c' direction, two more conditions that |b–c| is not smaller than a predetermined threshold value and that |b–a| or |b–a| is not smaller than another predetermined threshold value should be met. Here, 'a' represents a difference between the values of the upper and lower pixels, and these threshold values are determined through experiments. If none of the above three conditions is satisfied or if b is equal to c, the input pixel is determined to exist in the vertical area.

Referring to FIG. 3C, if the edge included in the input pixel is determined to form a slant line in the above-described method that is apparent in FIG. 3C, the slant line is determined to be tilted rightward (or leftward) when two smaller ones among b, c, and E and F are b and F (or c and E).

However, this condition may not be sufficient enough to determine the slant line to be tilted rightward (or leftward) because when a difference between a and b or between a and F (or between a and c or between a and E) is very small but a difference between b and F (or between c and E) is very large, it is very likely to end up in a wrong estimate of the direction of the slant line even though the input pixel has already been determined in step S51 to belong to an area other than the vertical area. Due to the wrong estimation of the direction of the slant line, colors of an output image may spread undesirably.

Therefore, in order to determine the slant line to be tilted rightward, two more conditions that the difference between a and any one of b, c, E and F is greater than a predetermined threshold value and that |b–F| or |c–E| is not greater than another predetermined threshold value should be satisfied. Here, these two predetermined threshold values are determined through experiments. If none of the above three conditions is satisfied or if c is equal to E or b is equal to F, the input pixel is determined to exist in the vertical area.

When the estimation of the direction of the slant line is complete, it is preferably determined in step S522 how precise the estimated direction of the slant line is by using a plurality of pixels adjacent to the input pixel, a process which becomes more apparent in FIG. 3D or 3E. FIG. 3D illustrates a case where the slant line is tilted rightward extending along a 'b' direction, and FIG. 3E illustrates a case where the slant line is tilted leftward extending along a 'c' direction.

Referring to FIG. 3D, when the slant line is determined to be tilted rightward (or leftward) in step S521, G, H, c and l (i.e., l–d, e–k, e–l, and f–l) are obtained in step S522. If l–d, e–k, e–l, and f–l are not smaller than a predetermined threshold value, the estimation of the direction of the slant line is determined to be precise. Otherwise, the input pixel is determined to exist in the vertical area.

Thereafter, an interpolated value of the input pixel is obtained using the estimated direction of the slant line in step S53. Preferably, interpolation is carried out using a plurality of pixels vertically and/or diagonally adjacent to the input pixel to obtain the interpolated pixel value.

Referring to FIG. 4, when the input pixel X is determined to belong to the vertical area, the interpolated pixel value is obtained using the values of the pixels n, o, f, k, p and q, which belong to the same row as the input pixel X but different odd fields from one another. On the other hand, when the input pixel X is determined to belong to the slant line area, the interpolated pixel value is obtained using the values of the upper and lower pixels f and k and the pixels e, g, j and l diagonally adjacent to the input pixel Y.

Specifically, when the input pixel X exists in the vertical area, the interpolated pixel value X' can be obtained using Equation (1) above. When the input pixel X exists in the slant line area and a slant line representing an edge included in the input pixel is tilted rightward, the interpolated pixel value X' can be obtained using Equation (2) above. When the input pixel X exists in the slant line area and the slant line is tilted leftward, the interpolated pixel value X' can be obtained using Equation (3) above.

The method enhancing the quality of reproduced images according to the second embodiment of the present invention may further involve adjusting a value of an output pixel by comparing the interpolated pixel value with the original input pixel value.

In general, when the above-described interpolation process is complete, it is safe to say that an entire process of converting an interlaced image into a progressive image is over. However, step S54 can still be meaningful for the reason that has already been described above. Step S54 where the adjusted pixel value is obtained can be carried out using Equation (4) above.

A method of enhancing the quality of reproduced images according to a third embodiment of the present invention, like its counterpart according to the first embodiment of the present invention, involves steps S51 and S52, thus reducing the possibility of errors occurring in the process of determining the direction of a slant line that represents an edge included in a predetermined input pixel and thus enhancing the quality of reproduced images. Since the method of enhancing the quality of reproduced images according to the third embodiment of the present invention is almost the same as its counterpart according to the first embodiment of the present invention, its description will not be repeated here.

A method of enhancing the quality of reproduced images according to a fourth embodiment of the present invention, like its counterpart according to the second embodiment of the present invention, involves steps S51 and S52, thus reducing the possibility of errors occurring in the process of determining the direction of a slant line that represents an edge included in a predetermined input pixel and thus enhancing the quality of reproduced images. Since the method enhancing the quality of reproduced images according to the fourth embodiment of the present invention is almost the same as its counterpart according to the second embodiment of the present invention, its description will not be repeated here.

A method of enhancing the quality of reproduced images according to a fifth embodiment of the present invention, like its counterparts according to the first and second embodiments of the present invention, involves steps S53 and S54, thus reducing the possibility of errors occurring in the process of determining the direction of a slant line that represents an edge included in a predetermined input pixel and thus enhancing the quality of reproduced images. Since the method enhancing the quality of reproduced images according to the fourth embodiment of the present invention is almost the same as its counterparts according to the first and second embodiments of the present invention, its description will not be repeated here.

The above-described methods of enhancing the quality of reproduced images according to the present invention can be realized as computer-readable program codes that can be recorded on a computer-readable recording medium. The computer-readable recording medium includes all kinds of recording devices in which data can be recorded in such a manner that a computer system can read the data from those recording devices. For example, the computer-readable recording medium includes ROM, RAM, CD-ROM, a magnetic tape, a floppy disk, an optical data storage device, and carrier waves, such as data transmission through the Internet. The computer-readable recording medium can be distributed over a plurality of computer systems connected to a network so that computer-readable program codes can be stored in or read from it in a decentralized manner.

According to the present invention, it is possible to prevent blurry images, afterimages, or aliased images by selectively processing fields, determining whether an edge of a subject on an image is included in a predetermined input pixel and whether the edge has a slant-line shape, estimating a direction of a slant line, determining how precise the estimation is, and adjusting a value of an output pixel corresponding to the input pixel. In addition, it is possible to considerably reduce the possibility of errors occurring in the process of determining whether or not there is a possibility of the edge having a slant-line shape by estimating the direction of the slant line and determining the precision of the estimation at the same time. Furthermore, it is possible to reduce a difference in saturation between an interlaced-scanned image and a sequential-scanned image and to prevent colors of an output image from undesirably spreading by using both even and odd fields to convert the interlaced-scanned image into the sequential-scanned image and obtaining an adjusted pixel value.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for enhancing the quality of a reproduced image comprised of a plurality of pixels having original pixel values corresponding to the image, comprising:
   a vertical area existence determination unit which determines whether or not an edge included in an input pixel selected from the plurality of pixels belongs to a vertical area;
   a slant line possibility determination unit which determines whether or not there is a possibility of the edge forming a slant line when the edge is determined to not belong to the vertical area;
   a direction determination unit which determines a direction of the slant line when the edge is determined to possibly form the slant line;
   an interpolation unit which calculates an interpolated pixel value for the input pixel based on the determination results provided by the vertical area existence determination unit, the slant line possibility determination unit, and the direction determination unit; and
   an adjusted pixel value calculation unit which compares the interpolated pixel value with an original input pixel value and adjusts the interpolated pixel value by designating one of the original input pixel value or the interpolated pixel as an output pixel value based on the comparison result,
   wherein the adjusted pixel value calculation unit designates the original input pixel value as an output pixel value when a difference between the interpolated pixel value and the original input pixel value is not greater than a predetermined threshold value, and
   designates the interpolated pixel value as the output pixel value when the difference between the interpolated pixel value and the original input pixel value is greater than the predetermined threshold value.

2. The apparatus of claim 1, wherein the vertical area existence determination unit determines that the input pixel exists in the vertical area when a difference (a) between values of upper and lower pixels, vertically adjacent to the input pixel, is smaller than a predetermined threshold value and determines that the input pixel exists in the slant line area when the difference (a) is greater than the predetermined threshold value.

3. The apparatus of claim 1, wherein the slant line possibility determination unit determines that the edge included in the input pixel may have a slant-line shape when a predetermined number of values among differences between values of two pixels, arranged at each side of the upper pixel, and values of their vertically corresponding pixels are not smaller than the predetermined threshold value and are obtained using two pixels located at one or the other side of the upper pixel and their diagonally corresponding pixels.

4. The apparatus of claim 1, wherein:
   an upper pixel is arranged above in an upper position vertically adjacent to the input pixel,
   a lower pixel is arranged in a lower position vertically adjacent to the input pixel,
   a first pixel pair is horizontally arranged at one side of the upper pixel,
   a second pixel pair is horizontally arranged at the opposite side of the upper pixel,
   a third pixel pair is horizontally arranged at one side of the lower pixel and, with respect to the input pixel, arranged diagonally to the first pixel pair, and
   a fourth pixel pair is horizontally arranged at the opposite side of the lower pixel, with respect to the input pixel, arranged diagonally to the second pixel pair, and
   the slant line possibility determination unit determines that the edge included in the input pixel may have a slant-line shape when:
   differences between values of each of the first pixel pair and values of a diagonally corresponding pixel of the third pixel pair, are smaller than a difference between the upper pixel and the lower pixel, and the differences between values of each of the first pixel pair and values of a diagonally corresponding pixel of the third pixel pair, are also smaller than differences between values each of the second pixel pair and values of the respective pixels of the fourth pixel pair.

5. The apparatus of claim 1, wherein the direction determination unit comprises:
   a direction estimator which estimates the direction of the slant line when it is determined that there is a possibility of the edge having a slant-line shape; and
   a precision determiner which determines precision of the estimation.

6. The apparatus of claim 5, wherein:
   (a) represents a difference between the values of two pixels vertically adjacent to the input pixel,
   (b) represents a difference between the values of two pixels diagonally adjacent to the input pixel,
   (c) represents a difference between the values of the other two pixels diagonally adjacent to the input pixel, and
   the direction estimator estimates the slant line to extend along a direction indicated by a smaller value between (b) and (c), when:
   a difference (b−c) is smaller than or greater than 0, and |b−c| and either |b−a| or |c−a| are greater than a predetermined threshold value.

7. The apparatus of claim 5, wherein:
   (a) represents a difference between the values of an upper pixel and a lower pixel arranged vertically adjacent to the input pixel,
   (c) and (E) represent differences between values of two pixels arranged at one side of the upper pixel and values of their diagonally corresponding pixels,
   (b) and (F) represent each of the respective differences between values of two pixels arranged at the other side of the upper pixel and values of their diagonally corresponding pixels, and
   the direction estimator estimates the slant line to extend along a direction indicated by a minimum among (b), (c), (E), and (F) when:
   a difference (a−c) or (a−E) or a difference (a−b) or (a−F) is greater than a predetermined threshold value,
   (c) and (E) are greater than or smaller than (b) and (F), respectively, and
   |c−E| or |b−F| is not greater than a predetermined threshold value.

8. The apparatus of claim 5, wherein the precision determiner determines the estimation of the direction of the slant line to be precise when:
   the direction estimator estimates the slant line to be tilted rightward or leftward,
   the difference (a) between the values (f) and (k) of the upper and lower pixels, a difference between (k) and a value (g) of an upper right pixel, a difference between (g) and a value (j) of a lower left pixel, and
   a difference between (f) and (j) are not smaller than a predetermined threshold value.

9. The apparatus of claim 1, wherein the interpolation unit obtains the interpolated pixel value using values of upper three cells and lower three pixels with respect to the input pixel, which belong to the same row as the input pixel but different columns from one another, when the edge included in the input pixel is determined to belong to the vertical area, and obtains the interpolated pixel value using the values of four pixels diagonally adjacent to the input pixel when the edge included in the input pixel is determined to belong to the slant line area.

10. An apparatus for enhancing the quality of a reproduced image comprised of a plurality of pixels having original pixel values corresponding to the image, comprising:
    a slant line possibility determination unit which determines that an edge included in an input pixel selected from the plurality of pixels may have a slant-line shape when differences between values of two pixels, arranged at each side of an upper pixel, and values of their vertically corresponding pixels are smaller than a difference between upper and lower pixels with respect to the input pixel and are obtained using two pixels, located at one side of the upper pixel, and values of their vertically corresponding pixels;
    a direction estimator which estimates the direction of the slant line when it is determined that there is a possibility of the edge having a slant-line shape; and
    a precision determiner which determines precision of the estimation,
    wherein:
    (a) represents a difference between the values of two pixels vertically adjacent to the input pixel,
    (b) represents a difference between the values of two pixels diagonally adjacent to the input pixel,
    (c) represents a difference between the values of the other two pixels diagonally adjacent to the input pixel, and
    the direction estimator estimates the slant line to extend along a direction indicated by a smaller value between (b) and (c), when:
    a difference (b−c) is smaller than or greater than 0, and |b−c| and either |b−a| or |c−a| are greater than a predetermined threshold value.

11. The apparatus of claim 10, wherein the precision determiner determines the estimation of the direction of the slant line to be precise when:
    the direction estimator estimates the slant line to be tilted rightward or leftward,
    the difference a between the values (f) and (k) and of the upper and lower pixels, a difference between k and a value g of an upper right pixel, a difference between (g) and a value (j) of a lower left pixel, and
    a difference between (f) and (j) are not smaller than a predetermined threshold value.

12. An apparatus for enhancing the quality of reproduced images, comprising:
    a slant line possibility determination unit which determines that an edge included in an input pixel may have a slant-line shape when differences between values of two pixels, arranged at one side of an upper pixel, and values of their diagonally corresponding pixels are smaller than differences between values of two pixels located at the other side of the upper pixel and values of their diagonally corresponding pixels;
    a direction estimator which estimates the direction of the slant line when it is determined that there is a possibility of the edge having a slant-line shape; and
    a precision determiner which determines precision of the estimation
    wherein:
    (a) represents a difference between the values of an upper pixel and a lower pixel arranged vertically adjacent to the input pixel,
    (c) and (E) represent differences between values of two pixels, arranged at one side of the upper pixel and values of their diagonally corresponding pixels, (b) and (F) represent each of the respective differences between values of two pixels arranged at the other side of the upper pixel and values of their diagonally corresponding pixels, and the direction estimator estimates the slant line to extend along a direction indicated by a minimum among (b), (c), (E), and (F) when:

a difference (a−c) and (a−E) or a difference (a−b) and (a−F) is greater than a predetermined threshold value, (c) and (E) are greater than or smaller than (b) and (F), respectively, and |c−b| or |E−F| is not greater than a predetermined threshold value.

13. The apparatus of claim 12, wherein the precision determiner determines the estimation of the direction of the slant line to be precise when the direction estimator estimates the slant line to be tilted rightward or leftward, the difference a between the values (f) and (k) and of the upper and lower pixels, a difference between (k) and a value (g) of an upper right pixel, a difference between (g) and a value (j) of a lower left pixel, and a difference between (f) and (j) are not smaller than a predetermined threshold value.

14. An apparatus for enhancing the quality of a reproduced image comprised of a plurality of pixels having original pixel values corresponding to the image, comprising:

an interpolation unit configured to obtain an interpolated pixel value using values of upper three cells and lower three pixels with respect to an input pixel selected from the plurality of pixels, which belong to the same row of an odd field that the input pixel belongs to but different even fields from one another, when an edge included in the input pixel is determined to belong to a vertical area; obtain the interpolated pixel value for the input pixel using values of four pixels diagonally adjacent to the input pixel when the edge included in the input pixel is determined to belong to a slant line area; and an adjusted pixel value calculation unit which compares the interpolated pixel value with an original input pixel value and adjusts the interpolated pixel value by designating one of the original input pixel value or the interpolated pixel as an output pixel value based on the comparison result, wherein the adjusted pixel value calculation unit designates the original input pixel value as an output pixel value when a difference between the interpolated pixel value and the original input pixel value is not greater than a predetermined threshold value and designates the interpolated pixel value as the output pixel value when the difference between the interpolated pixel value and the original input pixel value is greater than the predetermined threshold value.

15. A method of enhancing the quality of a reproduced image comprised of a plurality of pixels having original pixel values corresponding to the image, comprising:

(step a) determining whether or not an edge included in an input pixel selected from the plurality of pixels belongs to a vertical area;

(step b) determining whether or not there is a possibility of the edge forming a slant line when the edge is determined to not belong to the vertical area;

(step c) determining a direction of the slant line when the edge is determined to possibly form the slant line;

(step d) calculating an interpolated pixel value for the input pixel based on the determination results, obtained in (a), (b), and (c); and (step e) comparing the interpolated pixel value with an original input pixel value and adjusting the interpolated pixel value by designating one of the original input pixel value or the interpolated pixel as an output pixel value based on the comparison result, wherein in (step e), the original input pixel value is designated as an output pixel value when a difference between the interpolated pixel value and the original input pixel value is not greater than a predetermined threshold value, or the interpolated pixel value is designated as the output pixel value when the difference between the interpolated pixel value and the original input pixel value is greater than the predetermined threshold value.

16. The method of claim 15, wherein in (step a), the input pixel is determined to exist in the vertical area when a difference (a) between values of upper and lower pixels with respect to the input pixel is smaller than a predetermined threshold value and is determined to exist in the slant line area when the difference (a) is greater than the predetermined threshold value.

17. The method of claim 15, wherein in (step b), the edge included in the input pixel is determined to have a slant-line shape when a predetermined number of values among differences between values of two pixels, arranged at each side of an upper pixel, and values of their vertically corresponding pixels are not smaller than the predetermined threshold value and are obtained using two pixels located at one or the other side of the upper pixel and their diagonally corresponding pixels.

18. The method of claim 15, wherein in (step b), the edge included in the input pixel is determined to have a slant-line shape when differences between values of two pixels, arranged at one side of an upper pixel, and values of their diagonally corresponding pixels are smaller than the difference (a) between the upper and lower pixels and are also smaller than differences between values of two pixels, arranged at the other side of the upper pixel, and values of their diagonally corresponding pixels.

19. The method of claim 15, wherein (step c) includes:

(step f) estimating the direction of the slant line when it is determined that there is a possibility of the edge having a slant-line shape; and (step g) determining precision of the estimation.

20. The method of claim 19, wherein in (step f):

(a) represents a difference between the values of two pixels vertically adjacent to the input pixel, (b) represents a difference between the values of two pixels diagonally adjacent to the input pixel, (c) represents a difference between the values of the other two pixels diagonally adjacent to the input pixel, and the direction estimator estimates the slant line to extend along a direction indicated by a smaller value between (b) and (c), when:

a difference (b−c) is smaller than or greater than 0, and |b−c| and either |b−a| or |c−a| are greater than a predetermined threshold value.

21. The method of claim 19, wherein in (step f):

(a) represents a difference between the values of an upper pixel and a lower pixel arranged vertically adjacent to the input pixel, (c) and (E) represent differences between values of two pixels arranged at one side of the upper pixel and values of their diagonally corresponding pixels, (b) and (F) represent each of the respective differences between values of two pixels arranged at the other side of the upper pixel and values of their diagonally corresponding pixels, and the direction estimator estimates the slant line to extend along a direction indicated by a minimum among (b), (c), and (E), and (F) when:

a difference (a–c) or (a–E) or a difference (a–b) or (a–F) is greater than a predetermined threshold value, (c) and (E) are greater than or smaller than (b) and (F), respectively, and |c–b| or |E–F| is not greater than a predetermined threshold value.

22. The method of claim 19, wherein in (step g), the estimation of the direction of the slant line is determined to be precise when:

the slant line is estimated to be tilted rightward or leftward, the difference (a) between the values (f) and (k) of the upper and lower pixels, a difference between (k) and a value (g) of an upper right pixel, a difference between (g) and a value (j) of a lower left pixel, and a difference between (f) and (l) are not smaller than a predetermined threshold value.

23. The method of claim 15, wherein in (step d):

the interpolated pixel value is obtained using values of upper three cells and lower three pixels with respect to the input pixel, which belong to the same row as the input pixel but different columns from one another, when the edge included in the input pixel is determined to belong to the vertical area, or the interpolated pixel value is obtained using the values of four pixels diagonally adjacent to the input pixel when the edge included in the input pixel is determined to belong to the slant line area.

24. A method of enhancing the quality of a reproduced image comprised of a plurality of pixels having original pixel values original pixel values corresponding to the image, comprising:

(step s) determining that an edge included in an input pixel selected from the plurality of pixels may have a slant-line shape when differences between values of two pixels, arranged at each side of an upper pixel, and values of their vertically corresponding pixels are smaller than a difference between upper and lower pixels with respect to the input pixel and are obtained using two pixels, located at one side of the upper pixel, and values of their vertically corresponding pixels;

(step w) estimating the direction of the slant line when it is determined that there is a possibility of the edge having a slant-line shape; and (step x) determining precision of the estimation, wherein (step w):

(a) represents a difference between the values of two pixels vertically adjacent to the input pixel, (b) represents a difference between the values of two pixels diagonally adjacent to the input pixel, (c) represents a difference between the values of the other two pixels diagonally adjacent to the input pixel, and the slant line is estimated to extend along a direction indicated by smaller value between b and c, when:

a difference (b–c) is smaller than or greater than 0, and

|b–c| and either |b–a| or |c–a| are greater than a predetermined threshold value.

25. A method of enhancing the quality of a reproduced image comprised of a plurality of pixels having corresponding pixel values, comprising:

(step u) determining that an edge included in an input pixel selected from the plurality of pixels may have a slant-line shape when differences between values of two pixels, arranged at one side of an upper pixel, and values of their diagonally corresponding pixels are smaller than differences between values of two pixels located at the other side of the upper pixel and values of their diagonally corresponding pixels;

(step y) estimating the direction of the slant line when it is determined that there is a possibility of the edge having a slant-line shape; and (step z) determining precision of the estimations wherein in (step y):

(a) represents a difference between the values of an upper pixel and a lower pixel arranged vertically adjacent to the input pixel, (c) and (E) represent differences between values of two pixels, arranged at one side of the upper pixel and values of their diagonally corresponding pixels, (b) and (F) represent each of the respective differences between values of two pixels arranged at the other side of the upper pixel and values of their diagonally corresponding pixels, and the slant line is determined to extend along a direction indicated by a minimum among (b), (c), (E), and (F), when:

a difference (a–c) or (a–E) or a difference (a–b) or (a–F) is greater than a predetermined threshold value, (c) and (E) are greater than or smaller than (b) and (F), respectively, and |c–b| or |E–F| is not greater than a predetermined threshold value.

26. The method of claim 24, wherein in (step x), the estimation of the direction of the slant line is determined to be precise when:

the direction estimator estimates the slant line to be tilted rightward or leftward, the difference a between the values (f) and (k) and of the upper and lower pixels, a difference between (k) and a value (g) of an upper right pixel, a difference between (g) and a value (j) of a lower left pixel, and a difference between (f) and (j) are not smaller than a predetermined threshold value.

27. The method of claim 25, wherein in (step z), the estimation of the direction of the slant line is determined to be precise when:

the direction estimator estimates the slant line to be tilted rightward or leftward, the difference a between the values (f) and (k) and of the upper and lower pixels, a difference between (k) and a value (g) of an upper right pixel, a difference between (g) and a value (j) of a lower left pixel, and a difference between (f) and (j) are not smaller than a predetermined threshold value.

28. A method of enhancing the quality of a reproduced image comprised of a plurality of pixels having original pixel values corresponding to the image, comprising:

obtaining an interpolated pixel value using values of upper three cells and lower three pixels with respect to an input pixel selected from the plurality of pixels, which belong to the same row of an odd field that the input pixel belongs to but different even fields from one another, when an edge included in the input pixel is determined to belong to a vertical area;

obtaining the interpolated pixel value using values of four pixels diagonally adjacent to the input pixel when the edge included in the input pixel is determined to belong to a slant line area; and comparing the interpolated pixel value with an original input pixel value and adjusting the interpolated pixel value by designating one of the original input pixel value or the interpolated pixel as an output pixel value based on the comparison result, wherein the original input pixel value is designated as an output pixel value when a difference between the interpolated pixel value and the original input pixel value is not greater than a predetermined threshold value, or the interpolated pixel value is designated as the output pixel value when the difference between the interpolated pixel value and the original input pixel value is greater than the predetermined threshold value.

29. A tangible computer-readable recording medium on which computer-readable program codes enabling the method of claim 15 are recorded.

30. A tangible computer-readable recording medium on which computer-readable program codes enabling the method of claim 24 are recorded.

31. A tangible computer-readable recording medium on which computer-readable program codes enabling the method of claim 25 are recorded.

32. A tangible computer-readable recording medium on which computer-readable program codes enabling the method of claim 28 are recorded.

* * * * *

UNITED STATES PATENT AND TRADEMARK OFFICE
CERTIFICATE OF CORRECTION

PATENT NO. : 7,697,790 B2  Page 1 of 1
APPLICATION NO. : 10/717621
DATED : April 13, 2010
INVENTOR(S) : Hye-Yeon Kim et al.

It is certified that error appears in the above-identified patent and that said Letters Patent is hereby corrected as shown below:

Column 18, Line 59, change "estimation" to --estimation,--.

Column 21, Line 14, change "(l)" to --(j)--.

Column 22, Line 4, change "estimations" to --estimation,--.

Signed and Sealed this

Tenth Day of August, 2010

David J. Kappos
*Director of the United States Patent and Trademark Office*